United States Patent
Walter

(10) Patent No.: US 6,755,408 B2
(45) Date of Patent: Jun. 29, 2004

(54) PRECISION VISE

(76) Inventor: Joseph M. Walter, 164 Peppermint Rd., Lancaster, NY (US) 14086

( * ) Notice: Subject to any disclaimer, the term of this patent is extended or adjusted under 35 U.S.C. 154(b) by 36 days.

(21) Appl. No.: 10/144,981

(22) Filed: May 15, 2002

(65) Prior Publication Data

US 2003/0213777 A1 Nov. 20, 2003

(51) Int. Cl.$^7$ ................................................ B25B 1/24
(52) U.S. Cl. ..................................... 269/136; 219/69.11
(58) Field of Search ........................... 219/69.11, 69.12; 269/136, 266

(56) References Cited

U.S. PATENT DOCUMENTS

| | | | | |
|---|---|---|---|---|
| 4,008,886 A | * | 2/1977 | Murdoch | ............... 269/266 |
| 4,925,168 A | | 5/1990 | Ramsbro | |
| 4,928,938 A | * | 5/1990 | Ross | |
| 5,019,129 A | * | 5/1991 | Johanson | |
| 5,056,766 A | * | 10/1991 | Engibarov | ............... 269/136 |
| 5,063,013 A | * | 11/1991 | Ramsbro | |
| 5,685,060 A | * | 11/1997 | Tibbet | |
| 6,045,126 A | * | 4/2000 | Brzezinski | |

FOREIGN PATENT DOCUMENTS

FR        2619040 A1 *   2/1989  ........... B23Q/3/15

* cited by examiner

*Primary Examiner*—Geoffrey S. Evans
(74) *Attorney, Agent, or Firm*—Hodgson Russ LLP

(57) ABSTRACT

A vise with the precision to match the quality expected from a wire electrical discharge machine. A quality vise is provided to locate parts with extreme repeatability from part to part enabling production of parts with exact duplication. With the range of the vise opening a variety of sizes of parts may be held, and with the low compact profile of the vise there is a decrease likelihood of run into interference with the wire electric discharge machine while in the cutting operation. Due to the exposure of water in the cutting operation on the wire electrical discharge machine the vise is made from stainless steel. The vise comprising a body comprising sidewalls and a main alignment surface, the main alignment surface having a length and for contacting a workpiece along its length, with a solid stationary jaw extending from the main alignment surface for contacting the workpiece during clamping of the vise. A movable jaw than moves in the slot in the body and wherein the slot is defined by radiused contours which provide support to the sidewalls and prevent the sidewalls from being forced outward during clamping. The movable jaw comprising an insert to assist in clamping the workpiece to the alignment surface.

3 Claims, 2 Drawing Sheets

PRECISION VISE

In a circumstance of extremely high accuracy, design requirements as are met by use of a wire electrical discharge machine. Also, a very close focus must be taken in the design of the holding systems and clamping pressures used in the holding system. With the clamping pressure causing the object being clamped to be moved away from the alignment surface, the moveable jaw is designed to apply an inward movement to the alignment surface as the vise jaw is receiving clamping pressure.

Also, the guide track the moveable jaw rides in is contoured in a way that directly holds the walls of the vise from moving in an outward direction which would change or distort the alignment surface. Such distortion would affect the locating and repeatability of the clamping location, thus changing the location or size of the parts being repeatedly made.

To otherwise combat this distortion, a qualified operator of a wire electrical discharge machine would have to go through a complete set-up for every part machined. The association set-up cost are not conductive to a productive manufacturing environment.

Also, due to the circumstance of working occasionally in very restrictive areas or with small workpieces, the vise must be constructed in a way that is not bulky or interfering with machine travel.

DESCRIPTION OF PRIOR ART

In U.S. Pat. No. 4,925,168 (hereinafter the '168 patent) a stationary jaw constructed of a base with a section of the structure extending outward is shown. Extending from that outward section are two legs of the stationary jaw leading out and downward and connecting to a thin wall. This structure may assist in holding the workpiece close to the alignment surface, but the spring structure of the legs could prevent true reliability for location and keeping the workpiece square while applying clamping pressure. The '168 patent incorporates a leveling head to correct the tilt of the workpiece.

Also in the '168 patent the channel that the moveable jaw travels through is constructed of abutment surfaces at an incline that assist in holding the side walls and preventing them from being forced out during clamping pressure. This will affect the parallel and squareness of the alignment surface. This distortion may cause problems with the accuracy requirements imposed upon the process.

SUMMARY

The use of a radiused contour directly holds and supports and outer walls to prevent any outer flexing of the vise. Also, this contour will give more locating surface and more radiused corners which are a proven way to combat cracking conditions that would be of concern in any thin construction. These vises are of a thin construction due to the need to always minimize interferences in the work area.

In the design there are improved contact surfaces in the slide channel that directly hold and support the side walls of the vise during the clamping operation. As the clamping action is applied to the vise, it commonly causes a pushing force in an outward direction. This movement would interfere with the quality expected in a wire electric discharge machine.

In the design of our moveable jaw a sliding insert that will always stay in solid contact with the moveable jaw is provided. This solid contact prevents any twisting or spring tilting action during clamping. With the angle which the insert is set in the moveable jaw, the clamping pressure will cause the insert to draw down in the vise which will aid in drawing the workpiece tight to the alignment surface of the vise.

With the combined improvements of the slide channel for the moveable jaw and the design of an insert in the moveable jaw a design of a precision clamping vise that offers both quality and long service to the users is provided.

DETAILED DESCRIPTION

Figure 1:
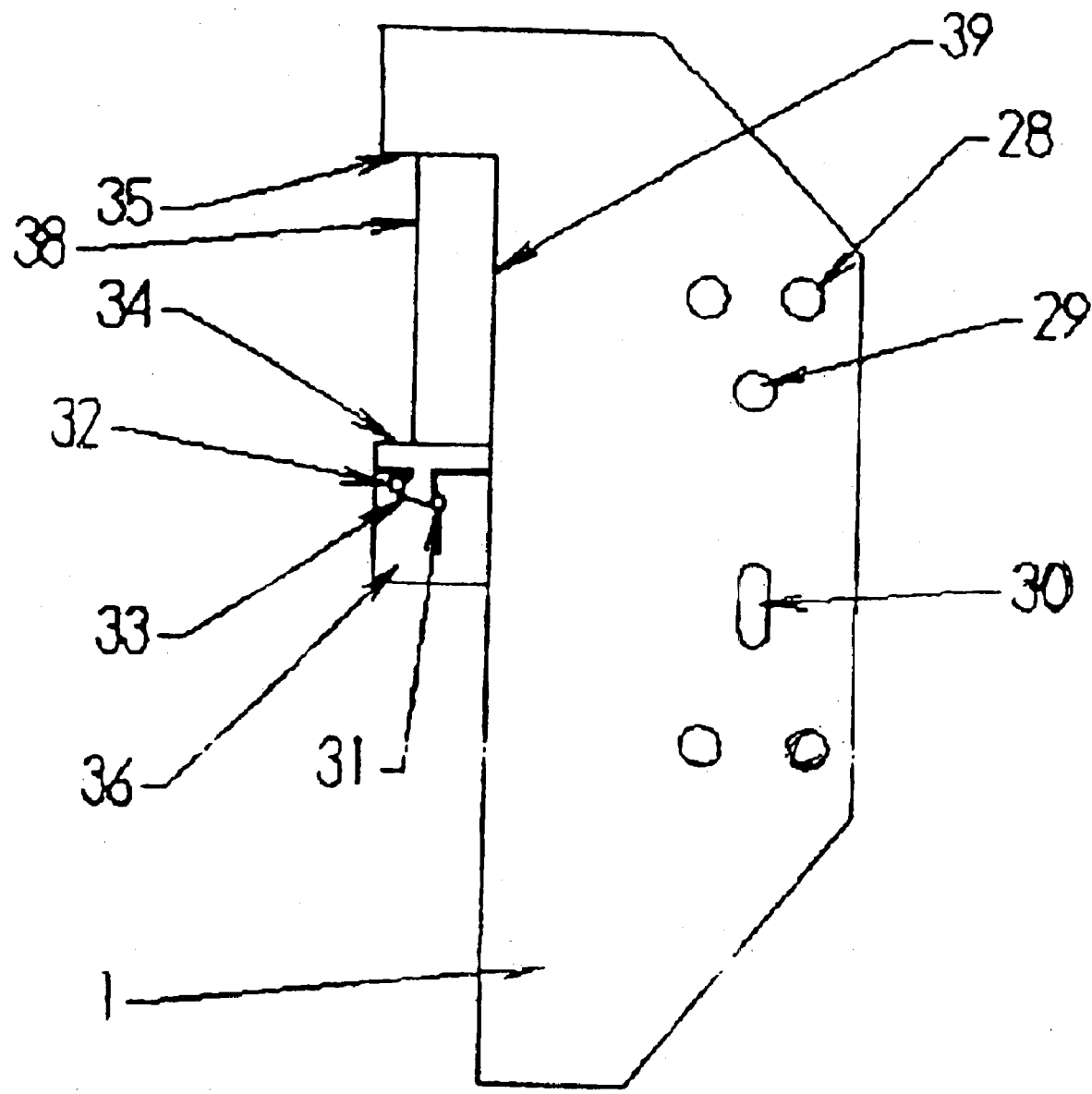
FIG. 1 shows a top plan view of the vise.
Figure 2:
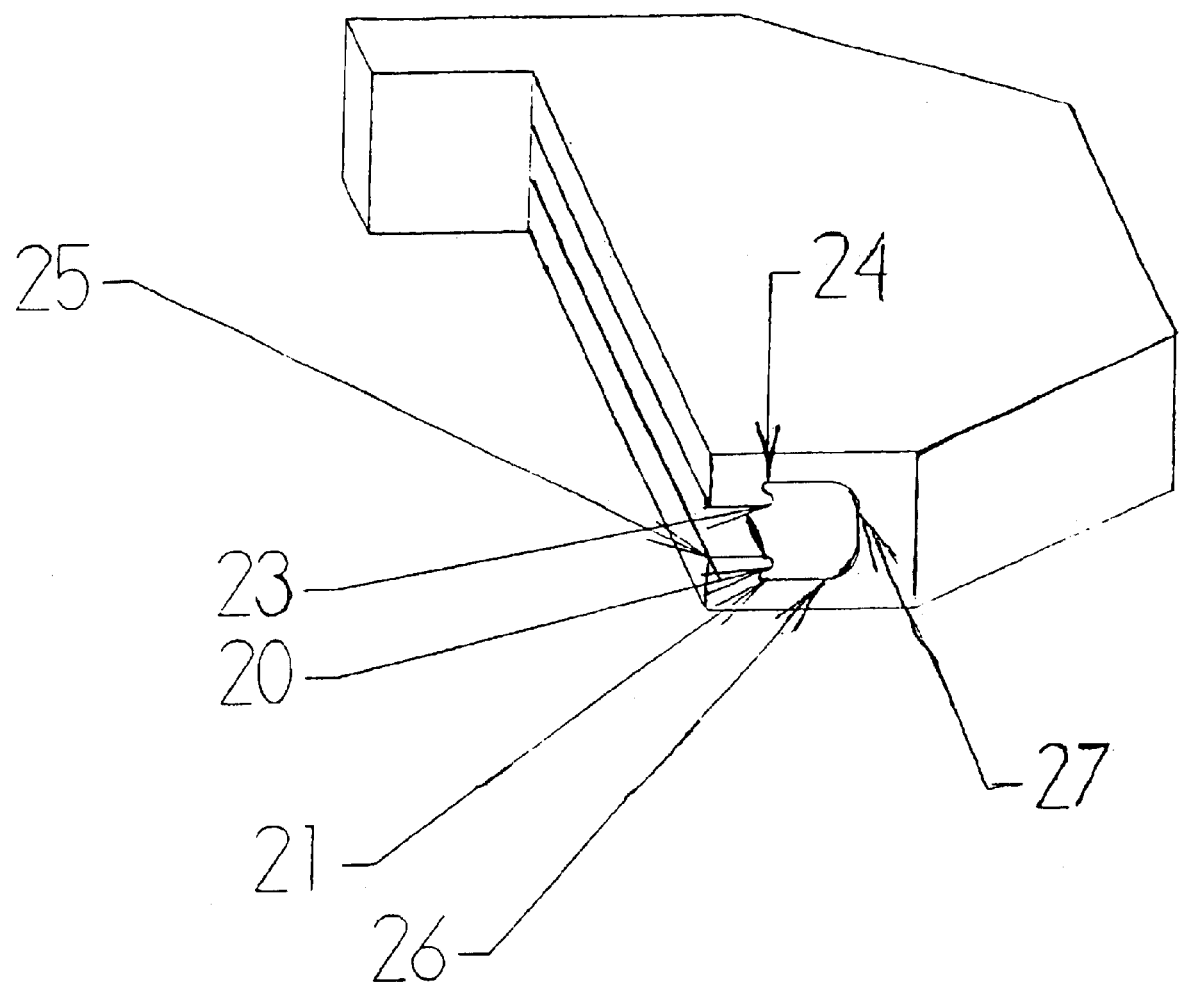
FIG. 2 shows a perspective view of the vise.

FIG. 2 shows the contour of the channel 25 that the moveable jaw 36 travels by means of the drive screw (not shown). This contour developed by the use of radiuses provides a strong structure to be used in an area requiring strength in a confined space. The low profile construction applies well to the clearance restrictions an operator may be concerned with when setting up a wire electric discharge machine.

In the clamping operation (as clamping on workpiece 38)as the moveable jaw 36 moves into the workpiece 38 the insert 34 in the moveable jaw 36 will slide in a inward direction and aid in forcing the workpiece 38 into the alignment surface 39.

The main body of the vise 1 is precision ground to assure parallel and squareness. The quality of the grind is essential to the proper function of the vise 1 in an assembly. The mount the vise 1 to the adapters [not shown] for mounting to a machine tool such as a wire electric discharge machine, screw fasteners [not shown] are threaded into the four tapped holes 28. In hole designated 29 a slip fit pin [not shown] is used as the pivot point to align the vise 1 on an adapter. A cam pin [not shown] located in a slot designated 30 is used to slide the vise 1 as the vise 1 is being indicated true in the initial set-up. The pressure on the cam pin to pivot the vise 1 is a safe way to pivot the vise due to the fact application of a hammer force on a precision tool as this is not desirable.

The guide channel 25 contour aids in supporting and the sliding of the moveable jaw 36 along the vise body 1. This movement is required to allow the vise 1 to hold a large range of part sizes (workpieces 38). The radius contours indicated by references number 20 and 23 contribute strength to the inner corners of the moveable jaw 38 as they contribute to providing a stable locating surface. The radius contours of 21 and 24 shown in FIG. 2 are critical radius contours to help support and lock the side walls during clamping activity to prevent any outward flex of the side walls of the vise 1. These radius contours also contribute to added strength and prevention to cracking under pressure. The final focus on adding strength to the slide channel are added radius contours in area 26 and 27 as shown in FIG. 2. Radius contours 26, 27, respectively, give strength and additional thickness to the side walls as they meet the vise body 1.

The screw (not shown) acts as the mechanical link that will drive the moveable jaw 36 along the alignment surface 39 to draw the jaw 36 to the workpiece 38. The alignment surface 39 is the surface that the workpiece 38 is drawn to in the clamping pressure by the insert 34. As the screw is rotated in the contoured slide channel 25 the moveable jaw 36 will slide toward the face of the stationary jaw 35. The stationary jaw 35 is precision ground in relation to the alignment edge 39. This ground surface of the stationary jaw 35 assures that during clamping the workpiece 38 is forced against the surface of the stationary jaw 35 and this forced contact will assure the workpiece 38 is positioned against alignment surface 39 and is perfectly square to the axis of the wire electrical discharge machine.

The moveable jaw 36, as it travels along the contoured channel 25, having radius contours as indicated by reference numbers 20, 21, 26, 27, 24, 23, will slide against the workpiece 38. As the pressure is applied to the workpiece 38, insert 34 which contacts the moveable jaw 36, will slide inward toward the alignment surface 39. When relieved from pressure insert 34 will return to a neutral position driven by the elastic insert designated 31 until equal pressure is applied to the elastic insert 32. The elastic inserts 31 and 32, respectively, also support and lock insert 34 into the moveable jaw 36.

The vise 1 is used in holding a workpiece 38 with very precise accuracy. The body of vise 1 is built in a way that the main surface represents the main alignment surface 39. This alignment surface 39 will receive contact from the workpiece 38 in its full length and give it the first axis of location. The main alignment surface 39 allows for repeatability in holding workpieces 38.

A solid stationary jaw extends out of the body or main alignment surface 39 and is contacted in the clamping operation by the workpiece 38. During clamping, the stationary jaw identifies the second axis of location and repeatability for holding workpieces 38.

The body of the vise 1 is constructed with a slot or channel 25 that runs the length of the vise 1 to guide and carry the movable jaw 36. The channel 25 the moveable jaw 36 travels through is constructed of radiused contours as indicated by reference numbers 20, 21, 26, 27, 23 and 24 that give direct support in preventing the side walls of the vise 1 from being forced or flexed in an outward direction during the clamping operation. These radiused contours 20, 21, 26, 27, 23, and 24 create a stronger vise 1 that is less likely to crack.

The moveable jaw 36 must assist in drawing the workpiece 38 to the alignment surface 39. Thus, the moveable jaw 36, has a second piece or insert 34 located on an abutted surface set at an angle. The angle is such that it causes movement when the pressure of the clamping action applied to the workpiece 38. In particular, it causes an inward movement toward the alignment surface 39. To return the insert 34 to a neutral position so that it is ready to perform the clamping and drawing function, it is held in place with elastic retainers 31, 32, respectively. These elastic retainers 31, 32, respectively, give spring to the movement of the insert 34.

The movable jaw 36 also has the same radiused contour to it that is found in the vise body 1. Again this radiused contour with a precision slip fit gives a more direct hold in preventing the side walls of the body of the vise 1 from flexing outward due to clamping pressure. The matched radiused contour of the moveable jaw 36 and channel 25 create jaw 36 are thus less likely to crack.

The stationary jaw is of solid material which is part of the body of the vise 1 and not an attachment to the vise 1. This assures solid non-movement of the stationary jaw. This solid construction also assures relocating consistency from workpiece 38 to workpiece 38. Additionally, this solid structure assures precision manufacturing, because parallel and squareness requirements will be maintained and will not move or change. This repeatability is of value in using this precision vise 1 in a quality manufacturing processes.

What is claimed is:

1. A vise for holding a workpiece, the vise comprising:
    a) a body having a length and comprising side walls and a main alignment surface, the main alignment surface for contacting the workpiece and for aligning the workpiece, the body having radiused contours that define a slot extending through the length or the body,
    b) a solid stationary jaw extending from the main alignment surface for contacting the workpiece during clamping of the vise,
    c) a movable jaw positioned in the slot and the slot and for guiding the movable jaw when it is moved toward or away from the stationary jaw, the radiused contours for providing support to the side walls and for preventing the side walls from being forced outward during clamping of the movable jaw, and
    d) a first axis of repeatability extending along the main alignment surface and a second axis of repeatability extending through the solid stationary jaw, the first axis of repeatability and second axis of repeatability for allowing a plurality of workpieces to be precisely held one after the other between the stationary jaw and the movable jaw.

2. A vise for holding a workpiece, the vise comprising:
    a) a body comprising side walls a main alignment surface and a length, the body of the vise having radiused contours defining a slot that extends the length of the body and through the body,
    b) a stationary jaw extending from the main alignment surface,
    c) a movable vise jaw guided and carried through the slot that is defined by the radiused contours, the radiused contours for providing support to the side walls and for preventing the side walls from being forced outward during clamping, the movable vise jaw for drawing the workpiece to the alignment surface as the workpiece is clamped between the movable vise jaw and the stationary jaw, the movable vise jaw comprising an insert positioned at an angle such that when the movable vise jaw clamps against the workpiece it moves inwardly towards the alignment surface, and
    d) elastic retainers positioned between the insert and the movable vise jaw, the elastic retainers for allowing the insert to clamp against the workpiece in a direction toward the alignment surface.

3. A method of holding a workpiece with a vise comprising the steps of:
    a) providing a body comprising side walls and a main alignment surface, the main alignment surface having a length and for contacting the workpiece along its length,
    b) providing a solid stationary jaw extending from the main alignment surface of the body,
    c) providing the body with radiused contours and defining a slot through the body with the radiused contours and wherein the radiused contours are for providing support to the side walls during clamping,
    d) providing a movable jaw and positioning the movable jaw in the slot defined by the radiused contours, and
    e) clamping a workpiece between the stationary jaw and the movable jaw.

* * * * *